(12) United States Patent
Nair et al.

(10) Patent No.: US 12,320,384 B2
(45) Date of Patent: Jun. 3, 2025

(54) SYSTEM, APPARATUS, AND METHOD OF DETERMINING CONDITION OF A BEARING

(71) Applicant: SIEMENS AKTIENGESELLSCHAFT, Munich (DE)

(72) Inventors: Sudev Nair, Karnataka (IN); Vincent Malik, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 325 days.

(21) Appl. No.: 17/622,707

(22) PCT Filed: Jun. 26, 2020

(86) PCT No.: PCT/EP2020/068130
§ 371 (c)(1),
(2) Date: Dec. 23, 2021

(87) PCT Pub. No.: WO2020/260654
PCT Pub. Date: Dec. 30, 2020

(65) Prior Publication Data
US 2022/0252104 A1    Aug. 11, 2022

(30) Foreign Application Priority Data
Jun. 26, 2019 (EP) .................... 19182543

(51) Int. Cl.
*F16C 19/52* (2006.01)
*G01M 13/045* (2019.01)

(52) U.S. Cl.
CPC .......... *F16C 19/527* (2013.01); *F16C 19/525* (2013.01); *G01M 13/045* (2013.01); *F16C 2233/00* (2013.01)

(58) Field of Classification Search
CPC .. G01M 13/04; G01M 13/045; G01M 13/028; G01M 15/12; G05B 23/0205;
(Continued)

(56) References Cited

U.S. PATENT DOCUMENTS 6,648,516 B2 * 11/2003 Eriksson ................ G01H 1/003
384/448
10,697,854 B2 * 6/2020 Yamashita ............ G01M 13/04
(Continued)

FOREIGN PATENT DOCUMENTS

CN       104285138 A    1/2015
CN       104792529 A    7/2015
(Continued)

OTHER PUBLICATIONS

Price, Kenneth., Rainer M. Storn, and Jouni A. Lampinen. Differential Evolution A Practical Approach to Global Optimization. 1st ed. 2005. Berlin, Heidelberg: Springer Berlin Heidelberg, 2005. (Year: 2005).*
(Continued)

*Primary Examiner* — Huy Q Phan
*Assistant Examiner* — Martin Walter Braunlich
(74) *Attorney, Agent, or Firm* — Lempia Summerfield Katz LLC (57) ABSTRACT

A system, apparatus, and method of determining a condition of at least one bearing in a system are provided. The method includes receiving operation data associated with the system from one or more sensing units associated with the system and determining an operation profile of the at least one bearing from the operation data. The operation profile includes a vibration response, a thermal response, and/or a frequency response associated with the at least one bearing. An impact force profile is determined during operation of the at least one bearing based on the operation profile and a
(Continued)

virtual bearing model trained on operation profiles and impact force profiles associated with a group of bearings comparable with the at least one bearing. The condition of the at least one bearing is determined based on the impact force profile.

18 Claims, 9 Drawing Sheets

(58) Field of Classification Search
CPC ...... F16C 19/527; F16C 19/52; F16C 19/525; F16C 2233/00; F16C 19/00; G01N 19/00; G01H 1/003; G01H 17/00; F16H 61/12
See application file for complete search history.

(56) References Cited

U.S. PATENT DOCUMENTS

| | | | |
|---|---|---|---|
| 11,385,137 B2* | 7/2022 | Samadani | ............ F16C 19/527 |
| 11,480,213 B2* | 10/2022 | Epps | ........................ F16C 33/34 |
| 2011/0241661 A1 | 10/2011 | Nomura et al. | |
| 2015/0081230 A1* | 3/2015 | Hamilton | ................ G01N 3/00 |
| | | | 702/34 |
| 2015/0369698 A1* | 12/2015 | Sakaguchi | ............ G01M 13/04 |
| | | | 702/56 |
| 2017/0315516 A1 | 11/2017 | Kozionov et al. | |
| 2018/0038413 A1* | 2/2018 | Aizawa | ................. F16C 19/527 |
| 2019/0064034 A1 | 2/2019 | Fayfield et al. | |
| 2020/0149585 A1 | 5/2020 | Epps | |
| 2020/0272139 A1* | 8/2020 | Rakuff | ................. G06F 17/142 |

FOREIGN PATENT DOCUMENTS

| | | |
|---|---|---|
| CN | 105653890 A | 6/2016 |
| CN | 105700503 A | 6/2016 |
| CN | 108760300 A | 11/2018 |
| CN | 109766626 A | 5/2019 |
| EP | 1731893 A1 | 12/2006 |
| GB | 2583402 A | 10/2020 |
| RU | 2646207 C1 | 3/2018 |
| WO | 2018208176 A1 | 11/2018 |

OTHER PUBLICATIONS

Qiao, Baijie, et al. "Impact-force sparse reconstruction from highly incomplete and inaccurate measurements." Journal of Sound and Vibration 376 (2016): 72-94.

Dong fang et al.:The simulation and stress analysis of the rolling bearing with multiple point defects, Journal of Vibration and Shock, vol. 37, Dec. 31, 2018, with English abstract. pp. 1-3.

* cited by examiner

SYSTEM, APPARATUS, AND METHOD OF DETERMINING CONDITION OF A BEARING

This application is the National Stage of International Application No. PCT/EP2020/068130, filed Jun. 26, 2020, which claims the benefit of European Patent Application No. EP 19182543.9, filed Jun. 26, 2019. The entire contents of these documents are hereby incorporated herein by reference.

BACKGROUND

The present embodiments relate to determining a condition of a bearing in a system.

Bearings used in motors or any rotating system may fail due to multiple reasons. For example, in the case of rolling bearings, service life of the rolling bearings may be affected due to loss of lubricant function. The lubricant may lose its lubrication ability due to concentrated stress that may cause increase in temperature. The lubricant may also lose its lubrication ability due to contamination of the lubricant caused by particles generated from wear.

The techniques to determine the condition of the lubricant include experimental methods. The experimental methods are based on data associated with operation of the bearing or system in which the bearing is used. The accuracy of the data based analysis depends on placement of sensing units that capture the data. For example, vibration response of the bearing may be depended on placement of the accelerometer.

Further, in certain scenarios, it is not possible to measure stress that may cause loss of the lubrication ability. In such scenarios, data based analysis may not accurately indicate the condition of the lubricant. Accordingly, the condition of the bearing may not be accurately identified.

SUMMARY AND DESCRIPTION

The scope of the present invention is defined solely by the appended claims and is not affected to any degree by the statements within this summary.

In light of the above, there exists a need to determine a condition of bearings. The present embodiments may obviate one or more of the drawbacks or limitations in the related art. For example, a system, an apparatus, and a method for determining a condition of a bearing in a system are provided.

An aspect of the present embodiments is a computer implemented method of determining a condition of at least one bearing in a system. The method including receiving operation data associated with the system from one or more sensing units associated with the system and determining an operation profile of the at least one bearing from the operation data. The operation profile includes a vibration response, a thermal response, a frequency response, or any combination thereof associated with the at least one bearing. An impact force profile is determined during operation of the at least one bearing based on the operation profile and a virtual bearing model trained on operation profiles and impact force profiles associated with a group of bearings comparable with the at least one bearing. The condition of the at least one bearing is determined based on the impact force profile.

Example bearings include fluid bearings and rolling bearing with rolling element or needle. An example system includes rotor, motor, drive train, gearbox, etc.

As used herein, "operation data" refers to data reflecting operating conditions of the bearing and/or the system that are received from different sources (e.g., sensors, scanners, user devices, etc.). The sensors measure operating parameters associated with the technical system. The sensors may include vibration sensors, current and voltage sensors, etc. For example, measurement of shaft voltage in a motor is mapped to an operation parameter of the bearing. The term "operation parameter" refers to one or more characteristics of the bearing. For example, the operation data includes values of vibration, temperature, current, magnetic flux, velocity, power of the system including the bearing.

As used herein "operation profile" refers to any combination of vibration response, thermal response, frequency response, magnetic response, etc. The responses are in-turn generated from the operation data. In an embodiment, the vibration response may be generated based on a root-mean-square of vibration data from the vibration sensors.

As used herein, "impact force profile" refers to impact force measured determined based on the operation profile. The impact force is measured during the operation of the bearing and is therefore referred to as impact force profile.

As used herein "virtual bearing model" refers to a software defined bearing that is generated based on operation data of the group of bearings and physics associated with the bearing. The virtual bearing model includes prediction and artificial intelligence algorithms to predict condition of the bearing.

The method may include predicting a stress distribution associated with the at least one bearing during operation. The stress distribution is predicted based on the impact force profile of the at least one bearing and the virtual bearing model. Further, the method may include predicting a remaining life of the at least one bearing based on the stress distribution and the predicted life using a neural network. The neural network is configured to perform gradient descent optimization.

The method may include identifying defect in the at least one bearing based on the impact force profile and determining contamination condition of the lubricant in the at least one bearing. In an embodiment, the defect is identified, and the contamination condition is determined by superimposing the operating profile of the at least one bearing on the operating profiles in virtual bearing model. Further, the superimposition is performed by deriving the impact force profile and determining the stress distribution.

The method may further include determining fatigue of the at least one bearing with respect to at least one of lubricant temperature rise, foreign particles in the lubricant, and reduction in oil film parameter of the lubricant based on the virtual bearing model.

A second aspect of the present embodiments includes a computer implemented method of generating the virtual bearing model. The method includes determining test operation profiles based on test operation data associated with the group of bearings, simulating the predetermined defects on a predefined bearing model comprising dataset pursuant to dynamic load rating standards and rating life standards associated with the group of bearings, and generating simulated operation profiles associated with the group of bearings based on the simulation of the predetermined defects on the predefined bearing model. The test operation profiles and the simulated operation profiles include vibration response, thermal response, and frequency response associated with the group of bearings.

As used herein "test operation data" refers to operation data generated from the group of bearings during testing of the bearings. The test operation data includes values of vibration, temperature, current, magnetic flux, velocity, power of the system including the bearings. The "test operation data" is differentiated from the "operation data" based on source bearing.

As used herein, "predefined bearing model" refers to model generated based on dynamic load rating standards and rating life standards associated with the group of bearings. For example, the predefined bearing model is a physics-based model generated through finite element modelling.

The virtual bearing model may include life prediction algorithms. Accordingly, the method may include predicting a life of the bearings when subject to the predetermined defects based on at least one of bearing load, load zone, bearing clearance, lubrication viscosity, and lubricant contamination associated with the one or more bearings in the group of bearings.

In an embodiment, to generate the virtual bearing model the method may include effecting one or more predetermined defects on one or more bearings in the group of bearings. The predetermined defects include lubricant contamination, brinell marks on raceways of the bearings, or spalling damage on the raceways. The predetermined defects may be accurately created using techniques such as Electric Discharge Machining (EDM) and Laser Engraving.

Further, the method may include operating systems including the bearings in one or more system load conditions. The system load conditions indicate a system load on the systems. For example, the system load condition includes situations where the load exists or does not exist.

Further, the method may include determining the test operation profiles associated with the group of bearings for the system load conditions. The test operation profiles are generated based on the test operation data received from radial position, axial position, and horizontal position.

The method may include determining simulated impact force from the test operation profiles and the simulated operation profiles. Further, the method may include predicting the simulated impact force based on the simulated operation profile and at least one mass of bearing rolling element, damping co-efficient, and stiffness associated with the bearing. The simulated impact force includes a steady component from steady-state movement of the bearings and/or a dynamic component associated with the predetermined defect.

In an embodiment, the method includes predicting the simulated impact force based on the simulated operation profile and at least one mass of bearing rolling element, damping co-efficient, and stiffness associated with the bearing. The simulated impact force includes a steady component from steady-state rotation and/or a dynamic component associated with the predetermined defect.

The method may include predicting stress distribution associated with the group of bearings based on the comparison of test operation profiles with the simulated operation profiles to update the stress distribution. In an embodiment, the stress distribution is predicted by performing the following acts: comparing the test operation profiles and the simulated operation profiles; updating the simulated impact force based on the comparison; generating the stress distribution based on the updated simulated impact force; and mapping the stress distribution to the predetermined defects using the at least one machine learning algorithm.

To update the simulated impact force, the method includes calibrating the updated simulated impact force associated with the group of bearings based on a difference between the test operation profiles and the simulated operation profiles using at least one machine learning algorithm.

In an embodiment, the method may include using a differential evolutionary algorithm to calibrate the updated simulated impact force. Accordingly, the method may further include: defining an upper stress limit and a lower stress limit for the group of bearings; determining probable stress distribution within the upper stress limit and lower stress limit through a mutation or recombination operation, where the probable stress distribution determined for the difference; and selecting the stress distribution from the probable stress distribution using continuous function optimization based on impact force difference.

The method is advantageous to generate a virtual bearing model with accurate remaining life prediction in case of contamination and loss of lubrication. The above-mentioned methods are a combination of physics-based simulation and machine-learning methods. The method of superimposing the operation profile of the at least one bearing and the operation profiles of the virtual bearing model enables the accurate estimation of remaining life of the at least one bearing. Further, knowledge generated from the group of bearings is used to generate the virtual bearing model. This enables fleet knowledge to be used to calibrate the remaining life. The above-mentioned methods may be used to provide availability of a bearing in a system.

A third aspect of the present embodiments includes an apparatus for determining condition of at least one bearing in a system. The apparatus includes: one or more processing units; and a memory unit communicative coupled to the one or more processing units. The memory unit includes a bearing module and a virtual bearing module stored in the form of machine-readable instructions executable by the one or more processing units. Further, the bearing module is configured to perform one or more method acts associated with the at least one bearing, and the virtual bearing module is configured to perform the method of generating a virtual bearing model.

A fourth aspect of the present embodiments includes a system that includes: one or more devices capable of providing operation data associated with operation of one or more systems; and an apparatus, communicatively coupled to the one or more devices, where the apparatus is configured for determining condition of at least one bearing in the one or more systems.

A fifth aspect of the present embodiments includes a computer-program product having machine-readable instructions stored therein that, when executed by one or more processing units, cause the one or more processing units to perform the above methods.

The above-mentioned and other features of the present embodiments will now be addressed with reference to the accompanying drawings. The illustrated embodiments are intended to illustrate but not limit the invention.

BRIEF DESCRIPTION OF THE DRAWINGS

The present invention is further described hereinafter with reference to illustrated embodiments shown in the accompanying drawings, in which.

DETAILED DESCRIPTION

Hereinafter, embodiments are described in detail. The various embodiments are described with reference to the drawings, where like reference numerals are used to refer to like elements throughout. In the following description, for purpose of explanation, numerous specific details are set forth in order to provide a thorough understanding of one or more embodiments. It may be evident that such embodiments may be practiced without these specific details.

As used hereinafter, "operation data" refers to data reflecting operating conditions of the bearing and/or the system that is received from different sources (e.g., sensors, scanners, user devices, etc.). The sensors measure operating parameters associated with the technical system. The sensors may include vibration sensors, current and voltage sensors, etc. For example, measurement of shaft voltage in a motor is mapped to an operation parameter of the bearing. For example, the operation data includes values of vibration, temperature, current, magnetic flux, velocity, power of the system including the bearing.

As used hereinafter, "virtual bearing model" refers to a software defined bearing that is generated based on operation data of the group of bearings and physics associated with the bearing. The virtual bearing model includes prediction and artificial intelligence algorithms to predict condition of the bearing.

As used hereinafter, "remaining life" refers to life of the bearing with defects and contamination. The remaining life includes remaining useful life (RUL), down-time, maintenance time, etc. "Remaining life" differs from "life". "Life" refers to life of the bearing without defect or life at the beginning of usage.

As used hereinafter, "condition of a bearing" refers to a state of the bearing. For example, the condition of the bearing includes the presence of defects in the bearing, contamination condition, remaining life, etc.

Figure 1:
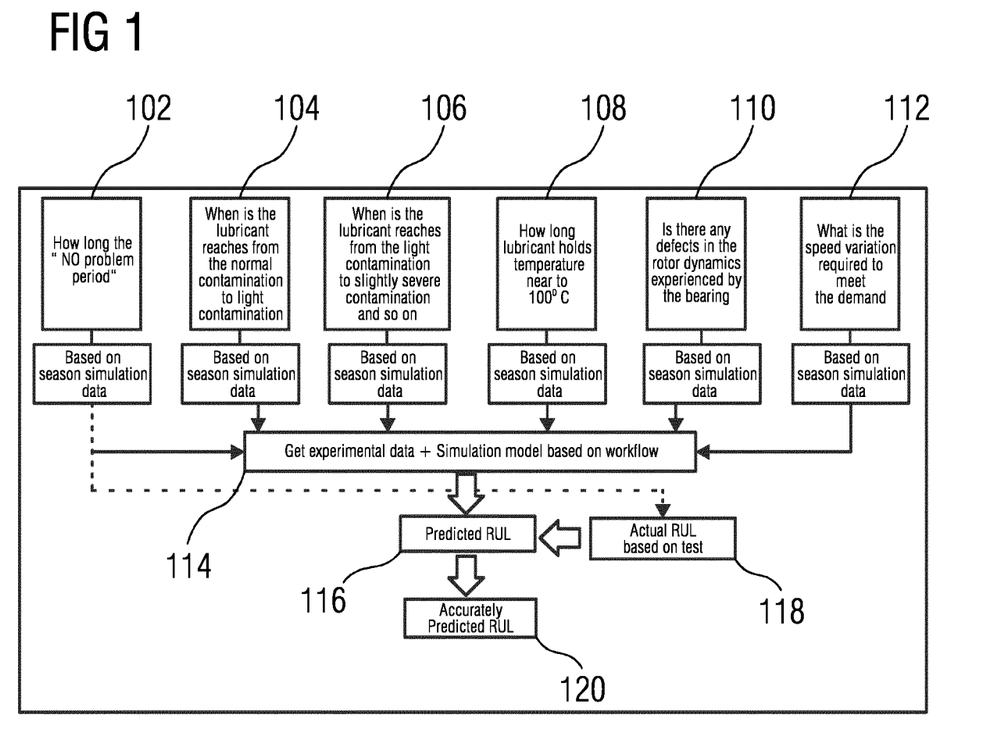
FIG. 1 illustrates stages associated with degradation of a bearing in a system, according an embodiment.

FIG. 1 illustrates stages 102-112 associated with degradation of condition of a bearing in a system according to an embodiment. The stages 102-112 are used as framework to accurately predict remaining life of the bearing. The stages 102-112 are determined based on operation data associated with the bearing and/or the system. Further, the stages 102-112 are determined based on a virtual bearing model of the bearing in the system.

Stage 102 indicates a "normal condition" of the bearing. In stage 102, the bearing is in good condition without contamination of the lubricant in the bearing. The stage 102 also includes the condition of normal contamination of the bearing. The condition of the bearing in stage 102 may be determined based on the operation data.

Stage 104 indicates a "light contamination" of the lubricant. In stage 104, the bearing condition transitions from normal contamination to light contamination. The transition between normal contamination to light contamination may be difficult to estimate. Accordingly, a combination of the operation data and the virtual bearing model is analyzed to determine the transition.

Stage 106 indicates a "severe contamination" of the lubricant. In stage 106, the bearing condition transitions from light contamination to severe contamination. The stage 106 is determined based on the combination of the operation data and the virtual bearing model.

Stage 108 indicates a "temperature condition" of the lubricant. In stage 108, the duration for which the lubricant is able to maintain a predetermined temperature. For example, if the lubricant lubrication ability is lost at 100° C., the predetermined temperature is below 100° C.

Stage 110 indicates a "system condition" of the system using the bearing. In stage 110, the condition of the system is determined based on the operation data to determine any fault conditions. Virtual bearing model is used to determine whether the fault conditions are associated with the bearing.

Stage 112 indicates a "load condition" of the system using the bearing. In stage 112, condition of the system is determined for various load conditions. The load conditions are mapped to bearing parameters associated with the bearing based on the virtual bearing model. For example, the load conditions are mapped to speed variation required from the bearing.

The analysis of the operation data and the virtual bearing model is performed at act 114. The analysis is further described in FIG. 8. Further, at act 116, remaining life of the bearing is predicted based on the analysis. At act 118, test operation data from similar bearings is received. The test operation data is compared with the operation data and the virtual bearing model. This comparison is used at act 120 to calibrate to the remaining life such that an accurate predication of remaining life is made.

Figure 2:
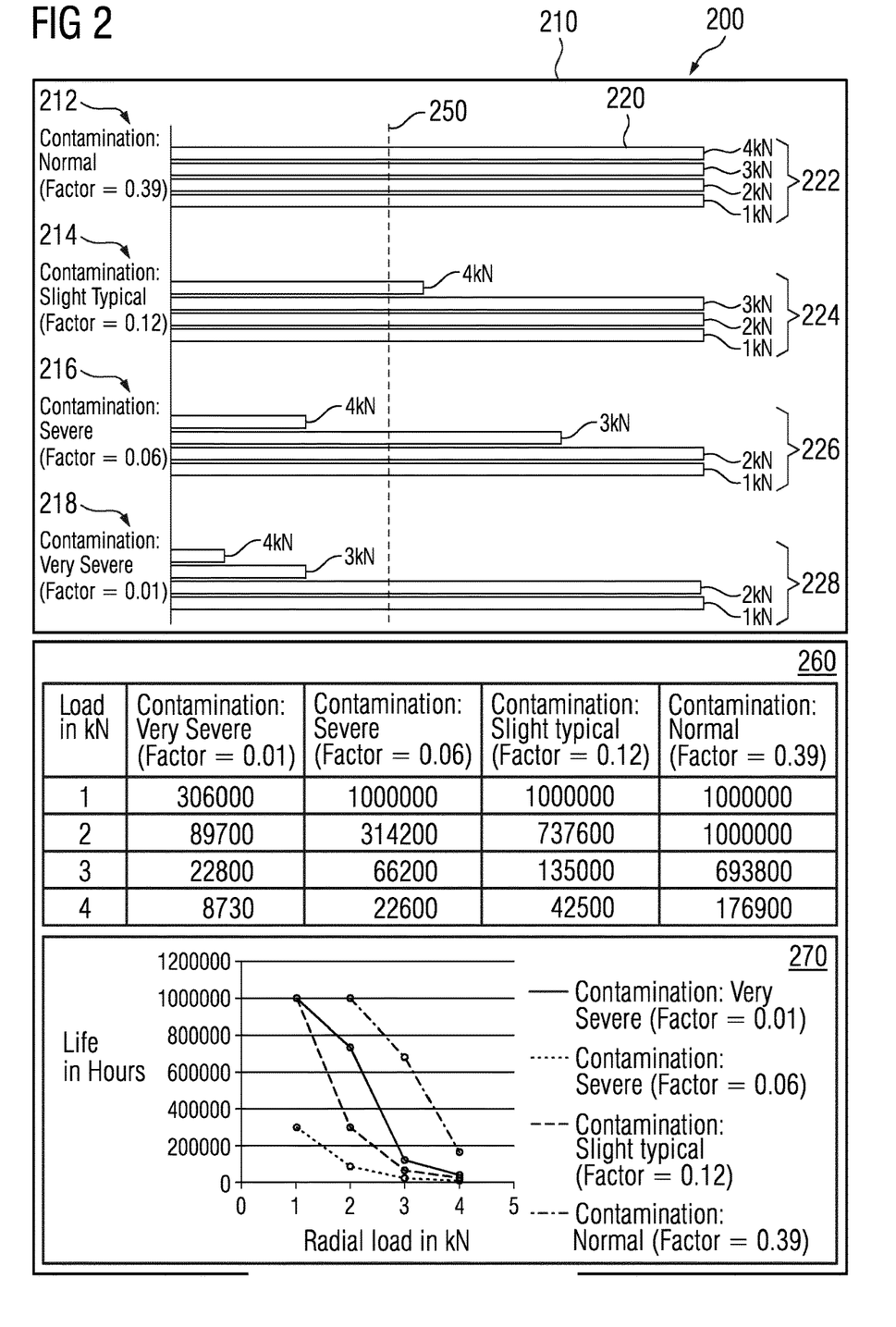
FIG. 2 illustrates a relation between the remaining life of a bearing with respect to the condition of the lubricant, according an embodiment.

FIG. 2 illustrates a relation 210 between life 220 of a bearing with respect to the condition of the lubricant. The life 220 is determined at the beginning of the usage of the bearing. The lubricant condition is indicated in four stages (e.g., normal contamination 212, light contamination 214, severe contamination 216, and extreme contamination 218). The life 220 is calculated based on number of cycles to failure. The relation 210 is determined for multiple load conditions 4 KN, 3 kN, 2 kN, and 1 kN.

For example, FIG. 2 illustrates that remaining life 222 for normal contamination is infinite. For light contamination, the remaining life 224 for 4 KN load is 42500 cycles to failure, and for 3 kN-1 kN, the remaining life is infinite. For severe contamination, the remaining life 226 for 4 kN is 22600 cycles, 3 kN is 66210 cycles, and for 2 kN and 1 kN, the remaining life is infinite. For extreme contamination, the remaining life 228 is 8730 cycles for 4 kN load, 22800 cycles for 3 kN load, 89700 cycles for 2 kN load, and indefinite for 1 kN load.

As shown in FIG. 2, the life 210 of the bearing is infinite. The relation 210 may not accurately predict the life 220. Accordingly, test operation data is used to determine remaining life 250 in normal usage. The relation 210 may be updated based on the remaining life 250. In the present example, the remaining life 250 is estimated at 40000 cycles to failure.

FIG. 2 also includes a tabular column 260 indicating the relation 210. Further, the relation 210 may also be illustrated by the graph 270.

Figure 3:
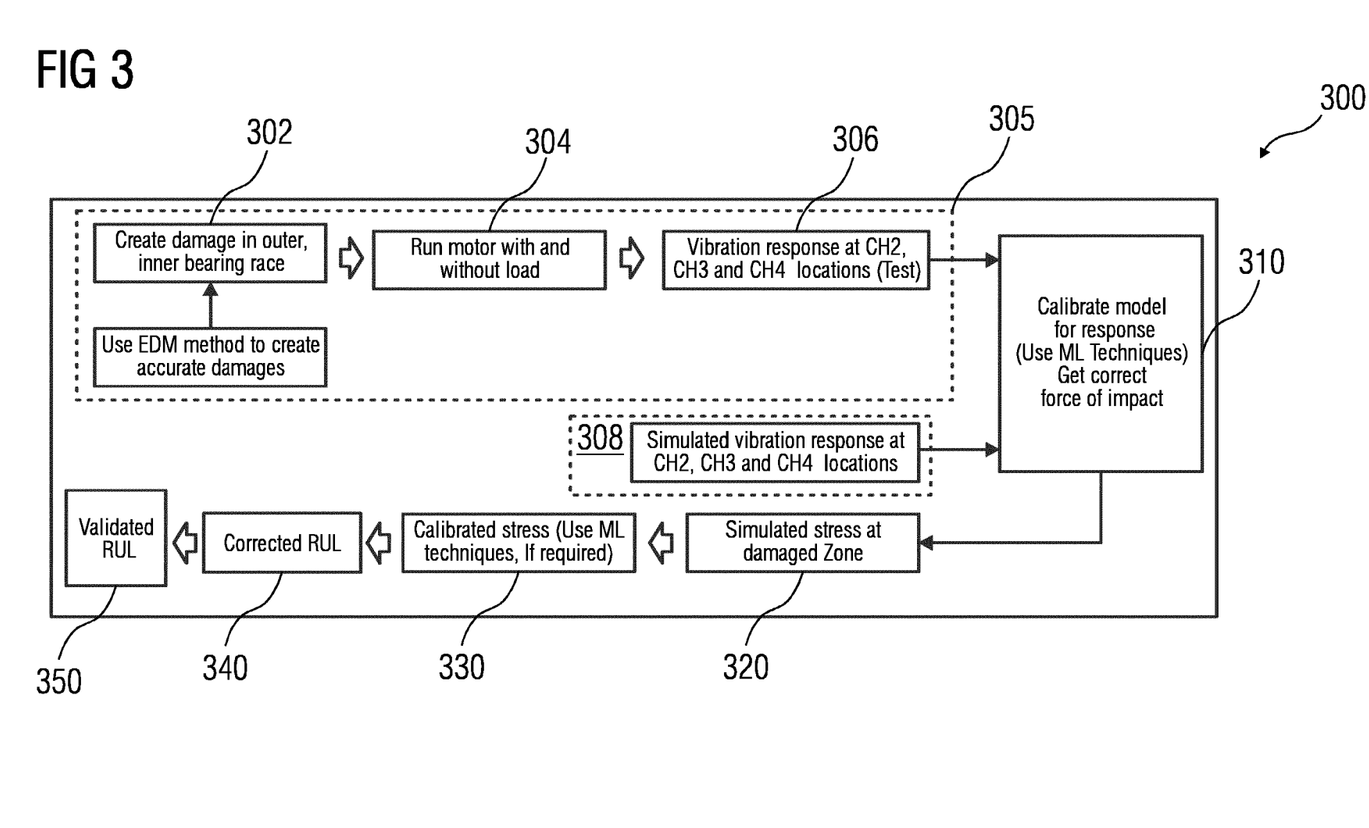
FIG. 3 illustrates a method 300 of generating a virtual bearing model, according to an embodiment.

FIG. 3 illustrates a method 300 of generating a virtual bearing model, according to an embodiment. The virtual bearing model is a trained model that is generated from a group of bearings that have comparable operation parameters. The group of bearings may each be housed in a bearing housing and may be provided in one or more systems. For example, the group of bearings may be rolling bearings provided in one or more rotating machinery.

The term "operation parameter" refers to one or more characteristics of the bearing. For example, the operation parameters include values of vibration, temperature, current, magnetic flux, velocity, power of the system including the bearing.

The method 300 includes two techniques of test-based modelling 305 and simulation-based modelling 308 to generate the virtual bearing model. Acts 302-306 relate to test-based modelling, and act 308 relates to simulation-based modelling. It will be understood by a person skilled in the art that the techniques may be performed in parallel or in sequence, without materially impacting the generated virtual bearing model.

At act 302, one or more predetermined defects on one or more bearings in the group of bearings are effected. For the purpose of the below explanation, the predetermined defects are effected on each bearing of the group of bearings. The predetermined defects include lubricant contamination, brinell marks on raceways of the bearings, or spalling damage on the raceways. It will be appreciated by a person skilled in the art that the predetermined defects may vary from one bearing to another. The predetermined defects may be accurately created using techniques such as Electric Discharge Machining (EDM) and Laser Engraving.

At act 304, the systems including the bearings are operated in one or more system load conditions. As used herein, "system load conditions" refer to a system load on the systems including the bearings. Further, the system load conditions indicate whether the systems are operated with the system load or not.

At act 306, the test operation profiles associated with the group of bearings is generated. The test operation profiles are generated based on test operation data for the system load conditions. The test operation data is received from one or more sensing units located radial position, axial position, and horizontal position outside and within bearing housing associated with each of the bearings.

As used herein, the test operation profiles refer to vibration response, thermal response, and/or frequency response generated from the test operation data. In an embodiment, the vibration responses from the group of bearings are referred to as the test operation profiles.

At act 308, the predetermined defects are simulated on a predefined bearing model. The predefined bearing model includes a dataset pursuant to dynamic load rating standards and rating life standards associated with the group of bearings. The dynamic load rating standards and rating life standards are physics based.

Further, at act 308, simulated operation profiles associated with the group of bearings are generated. The simulated operation profiles include vibration response, thermal response and/or frequency response. The simulated operation profiles are generated in response to simulation of the predetermined defects on the predetermined model.

At step 310, simulated impact force is predicted based on the simulated operation profiles. The simulated impact force is also based on bearing rolling element (e.g., needle or balls), damping co-efficient, and/or stiffness associated with the bearing. The simulated impact force includes a steady component from steady-state movement of the bearings. In addition, the simulated impact force includes a dynamic component associated with impact caused by the predetermined defect. The determination of the simulated impact force is elaborated in FIG. 6.

Further, the test operation profiles are compared with the simulation operation profiles. The simulated impact force is updated based on the comparison. Machine-learning algorithms such as genetic algorithm are used to compare the test operation profiles with the simulated operation profile. In an embodiment, a differential evolutionary algorithm is used to update the simulation operation profiles.

At act 320, the stress distribution is generated based on the simulated impact force. For example, Hertz theory of contact stress is used to determine the stress distribution based on the impact force.

At act 330, the stress distribution is updated based on the impact force difference. In an embodiment, the stress distribution is updated using a machine learning algorithm such as a differential evolutionary algorithm. The differential evolutionary algorithm is used to determine limits of the stress distribution. When the upper stress limit and lower stress limit is determined, probable stress distribution within the upper stress limit and lower stress limit is determined through a mutation or recombination operation.

The stress distribution is selected from the probable stress distribution using continuous function optimization based on impact force difference. The impact force difference is used to generate an optimization problem for the differential evolutionary algorithm. The optimization problem is used to narrow the probable stress distribution based on a fitness score to the optimization problem.

At act 340, the updated stress distribution is mapped to the predetermined defects using the differential evolutionary algorithm. The operations performed include limit setting, mutation, recombination, and selection. The output of the above-mentioned operations result in the mapping the stress distribution to the predetermined defects.

At act 350, a life of the bearings when subject to the predetermined defects is predicted. The life is predicted based on the stress distribution, bearing load, load zone, bearing clearance, lubrication viscosity, and lubricant contamination associated with the group of bearings.

Accordingly, the virtual bearing model generated in method 300 may be used to determine remaining life of an unknown bearing based on operation data associated with the unknown bearing. Further, the virtual bearing model is capable of identifying impact force and defect in the unknown bearing. The detailed description on the usage of the virtual bearing model is described in FIG. 7.

Figure 4:
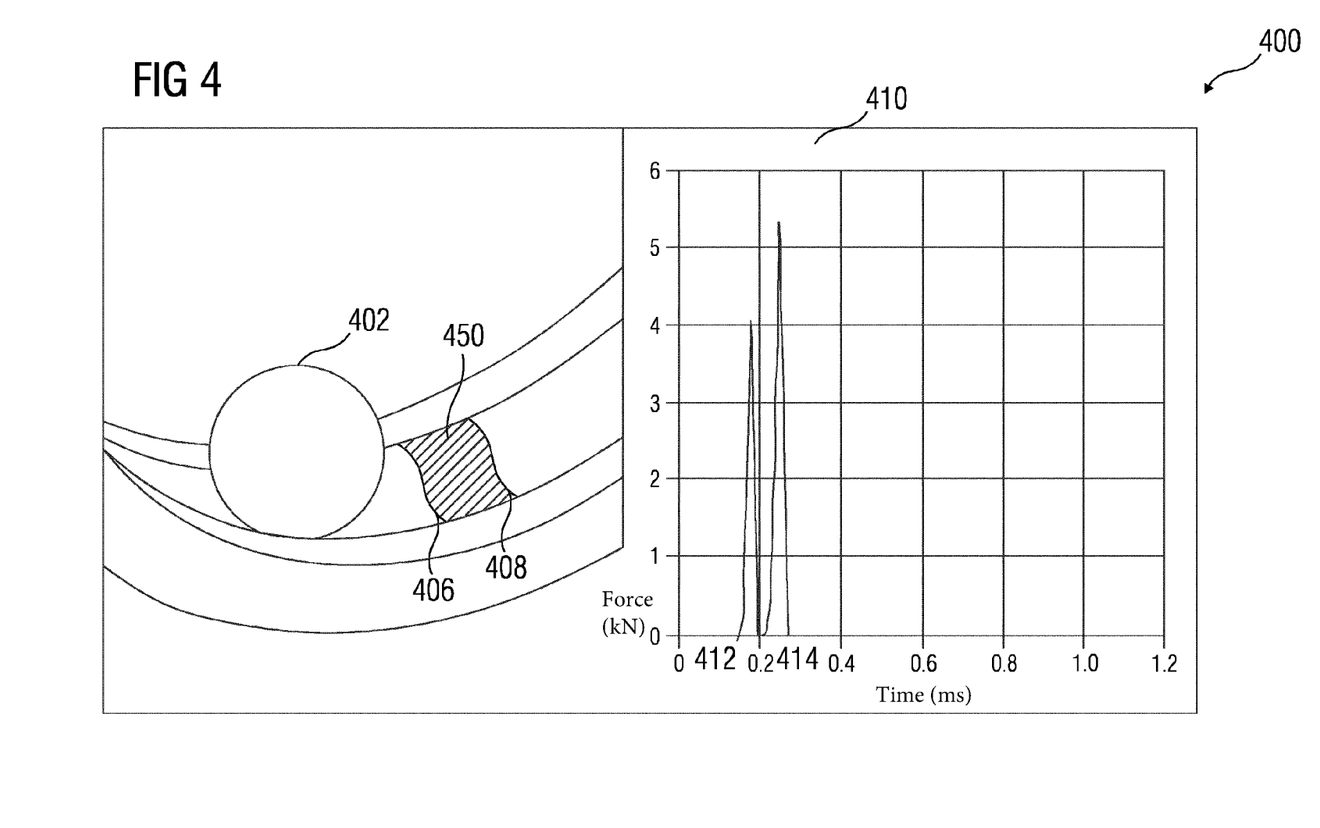
FIG. 4 illustrates a virtual bearing model 400 of a ball in a rolling bearing, according to an embodiment.

FIG. 4 illustrates a virtual bearing model 400 of a ball in a rolling bearing, according to an embodiment. The virtual bearing model 400 includes a simulated ball 402 on an outer-raceway 404 with a simulated defect 450. The defect 450 includes a leading edge 406 and a trailing edge 408. The leading edge 406 is referred as the entry edge, and the trailing edge 408 is referred as the exit edge.

The virtual bearing model 400 is generated based on associated boundary conditions. For example, the boundary conditions may include fixing the rolling bearing with a bolt joint, providing surface to surface contact with a proper frictional coefficient, and a rotational frequency for inner ring.

The virtual bearing model 400 is used to determine the impact force of the rolling bearing on the physical defect. The impact force is determined based on the simulated ball 402 movement on the simulated defect 450. The detailed description of the movement is illustrated in FIG. 5.

Figure 5:
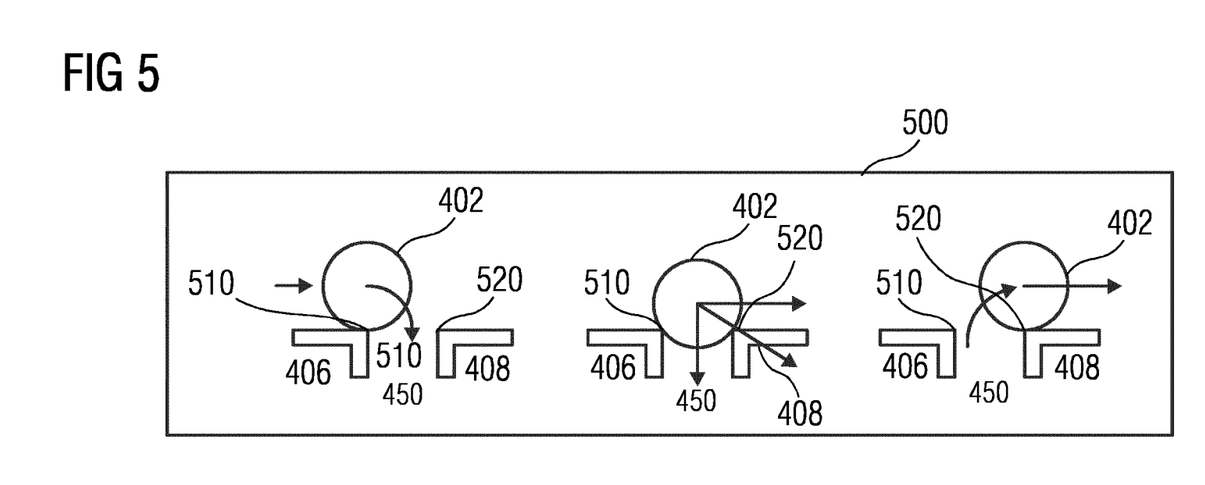
FIG. 5 illustrates stages in impact cycle of the rolling bearing in FIG. 4, according to an embodiment.

FIG. 5 illustrates stages in an impact cycle 500 of the rolling bearing in FIG. 4 against the leading edge 406 and the trailing edge 408. The impact cycle 500 includes two impulses 510 and 520 at the leading edge 406 and the trailing edge 408. The impulse 520 is generally higher than the impulse 510.

For example, the rolling bearing is in a rotor with load conditions of static load 400N. Further, a shaft in the rotor is operated at 1478 revolutions per minute. The virtual bearing model is used to determine the impact force for the rolling bearing based on the movement of the simulated ball 402 on the leading edge 406 and the trailing edge 408 over the simulated defect 450. Accordingly, leading edge force 412 is determined as 4.07 kN, and trailing edge force 414 is determined as 5.39 kN. The leading edge force 412 is observed at 0.17991 ms, and the trailing edge force is observed at 0.24993 ms. A time difference between the leading edge force 412 and the trailing edge force 414 is used to determine defect size. This is explained in FIG. 6.

Figure 6:
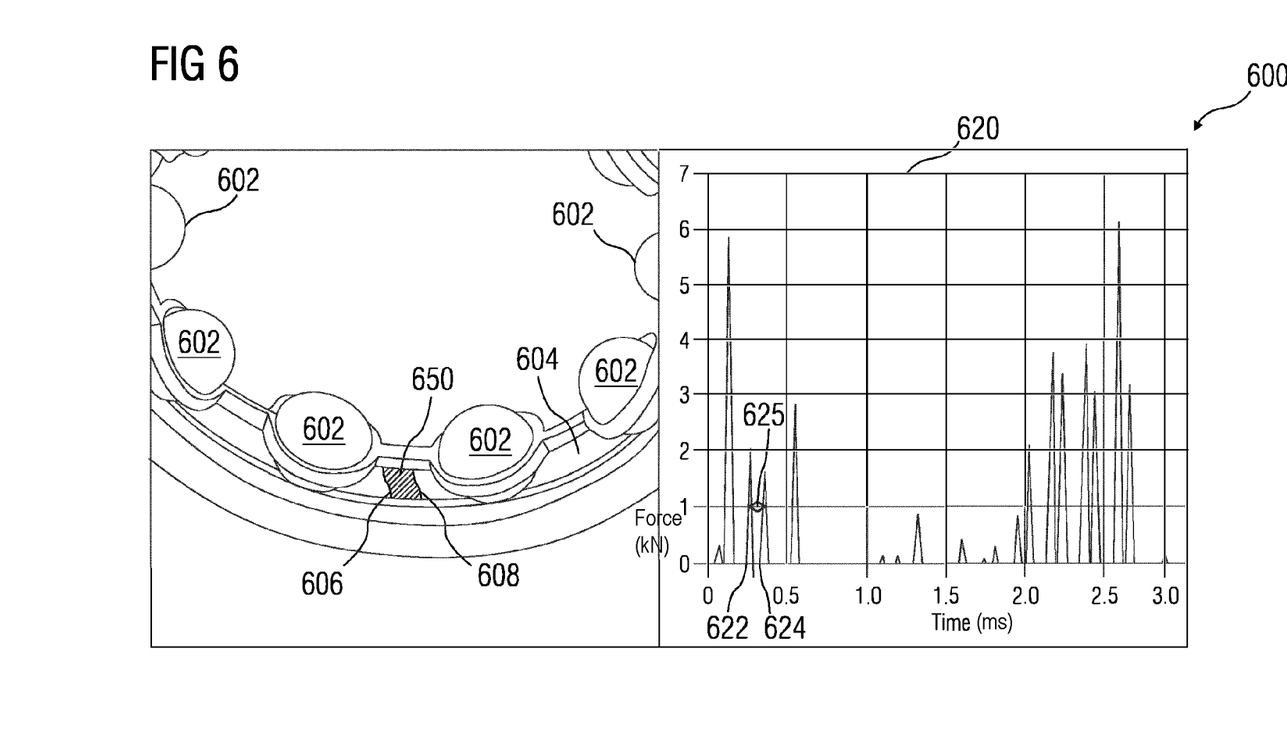
FIG. 6 illustrates a virtual bearing model for a rolling bearing with multiple balls, according to an embodiment.

FIG. 6 illustrates a virtual bearing model 600 for a rolling bearing with multiple balls, according to an embodiment. The virtual bearing model 600 in FIG. 6 illustrates simulated balls 602 on an outer-raceway 604. The virtual bearing model 600 also illustrates a simulated defect 650 on the outer-raceway 604 with leading edge 606 and trailing edge 608.

The virtual bearing model 600 is configured to illustrate impact forces generated due to the simulated defect 650 at the leading edge 606 and the trailing edge 608. The impact forces are illustrated in graph 620. The leading edge force is referred to by the numeral 622, and the trailing edge force is referred to by the numeral 624.

The virtual bearing model 600 predicts the impact forces illustrated in the graph 620. The prediction of the impact forces may assume steady-state rotation. Most rolling bearing applications involve the steady-state rotation on the outer-raceway and/or inner-raceway. The rotational speeds may be moderate to avoid ball centrifugal forces or significant gyroscopic motions. The strength of the impact felt by the rolling bearing when the ball is traversing a defect area depends on the relative speeds and the external load applied.

Based on the above, the impact force may produces a static component, developed using the below equations, and a dynamic component arising from the impact forces of the simulated ball 602 against the edges 606 and 608 of the simulated defect 650.

$$Q_i = Q_{max}\left[1 - \frac{1-\cos\Psi_i}{2\varepsilon}\right]^{1.5} \quad -\Psi_m \leq \Psi_i \leq \Psi_m$$

$$Q_i = 0 \quad \text{elsewhere}$$

$$\left[\frac{1}{2}mV_1^2 + \frac{1}{2}I\omega_1^2\right] + \left[mg\frac{B_d}{2}\right] = \left[\frac{1}{2}mV_2^2 + \frac{1}{2}I\omega_2^2\right] + \left[mg\frac{B_d}{2}\cos\eta\right]$$

where:
m is mass of the ball;
mg is mass of the ball and acceleration due to gravity;
$B_d$ is ball diameter;
I is mass moment of inertia;
V is linear velocity of the ball; and
ω is angular velocity of the ball.

Further, the impact force is dependent on a load zone of the rolling bearing. The virtual bearing model 600 considers whether the simulated balls 602 are in the load zone and the clearance between the outer-raceway 604 and the inner-raceway (not shown in FIG. 6). Accordingly, the impact forces are determined based on the below equations.

Impact forces from experiments with bodies falling freely against a steel plate show that the impact force varies as the square of shock velocity is used to determine the impact forces 622 and 624.

$$F_D = K_{imp\_1}\Delta V^2$$

$K_{imp\_1}$ is a constant depending on the impacting material and the falling mass values.

$$F_D = K_{imp\_2}F_S\Delta V^2$$

$K_{imp\_2}$ is a constant depending only on the impacting material.
$F_S$ is Static force from the falling mass.

$$F_T = F_S + F_D$$

Considering the equation $Q_i$ for impact forces, an equation for total impact force may be determined as below.

$$F_T = F_S[1 + K_{imp\_2} \times \Delta V^2] = F_S\left[1 + K_{imp\_2} \times \left(\frac{d_{def}}{B_d}\right)\right]$$

$$F_T = Q_{max}\left[1 - \frac{1-\cos\Psi_i}{2\varepsilon}\right]^r\left[1 + K_{imp} \times \left(\frac{d_{def}}{B_d}\right)\right]$$

$K_{imp}$ is the impacting coefficient, depending both on the impacting material and the bearing geometry.

The simulated defect 650 may be of multiple widths. The width may be reverse calculated based on speed of the simulated balls 602 and a time difference between the leading edge force 622 and the trailing edge force 624. In FIG. 6, defect width 625 of the simulated defect 650 is determined based on the speed of the simulated balls 602 and the time difference.

In an embodiment, when the defect width 625 is known, the impact forces 622 and 624 may be determined as follows. In the present embodiment, the impact forces 622 and 624 are considered proportional to the square of the defect width 625. Accordingly, $F_T$ is derived as follows.

$$F_T = k\left[\frac{d_{def}}{B_d}\right]^2$$

where:
$B_d$ is the rolling element diameter;
k is the constant of proportionality; and
$d_{def}$ is the defect width.

Figure 7:
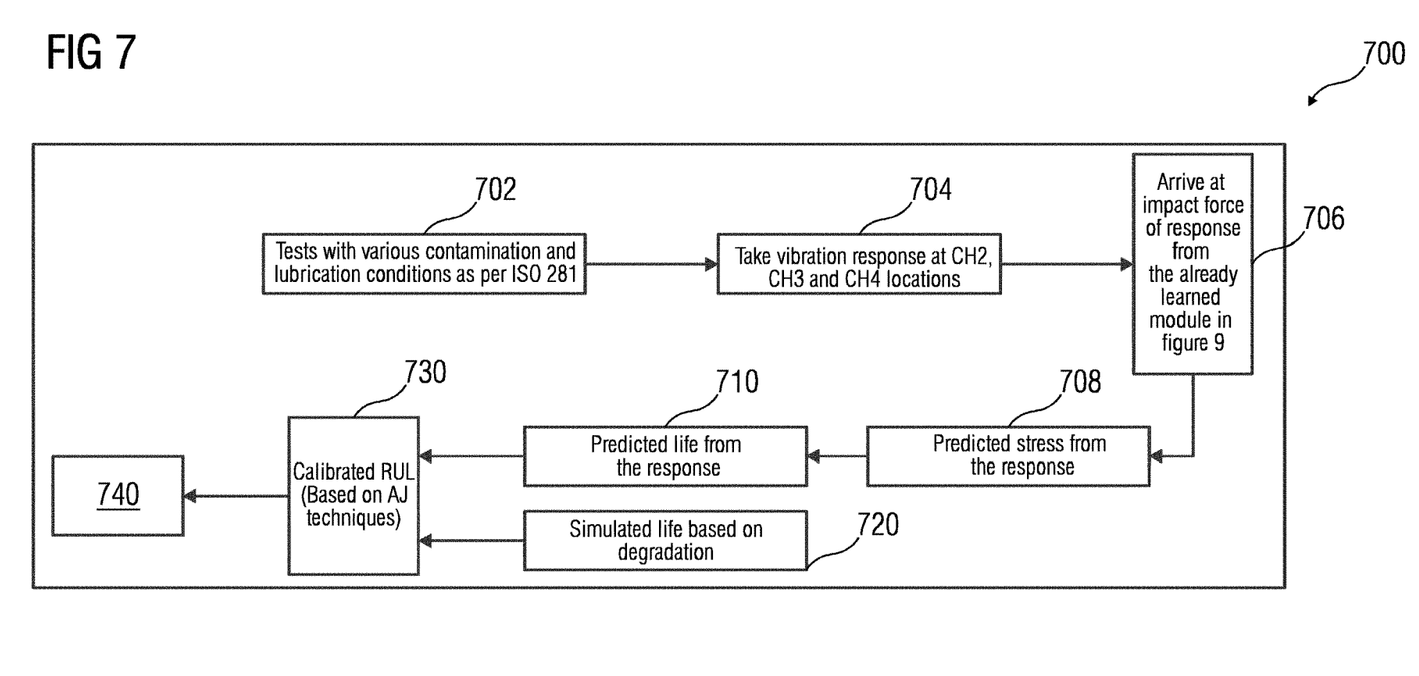
FIG. 7 illustrates a method of determining a condition of a bearing in a system, according to an embodiment.

FIG. 7 illustrates a method 700 of determining a condition of a bearing in a system, according to an embodiment. The bearing in FIG. 7 may be compared to the unknown bearing in FIG. 3. Accordingly, the method 700 may be used when there is no historical data on the condition of the bearing.

The method 700 begins with act 702. At act 702, operation data associated with the system is received. The operation data is generated from one or more sensing units associated with the system. The operation of the system may reflect the condition of the bearing. Therefore, operation data of the system is used to analyze the condition of the bearing.

At act 704, an operation profile of the bearing is determined from the operation data. The operation profile includes a vibration response, a thermal response, and/or a frequency response associated with the bearing. For example, the operation data includes vibration sensor data.

The vibration sensor data is used to generate a vibration response at different locations such as a radial position outside the bearing, an axial position within the bearing, and a radial position within the bearing. The vibration response may be generated along with current signatures to validate the generated vibration response.

At act 706, an impact force profile is determined during operation of the bearing based on the operation profile and a virtual bearing model. The virtual bearing model is comparable to the model generated in FIG. 3. Accordingly, the virtual bearing model is a trained model that is generated based on operation profiles and impact force profiles associated with a group of bearings comparable with the bearing. In an embodiment, the operation profiles of the group of bearings are superimposed on the operation profile of the (unknown) bearing. Based on the superimposition, the impact force profile for the (unknown) bearing is determined from the impact force profiles for the group of bearings.

At act 708, a stress distribution associated with the bearing is predicted during operation of the bearing. The stress distribution is predicted based on the impact force profile. Further, the stress distribution may be generated directly from the virtual bearing model based on the superimposition.

At act 710, a remaining life of the bearing is predicted based on the stress distribution. Further, the virtual bearing model is also used to determine the remaining life. For example, the virtual bearing model includes a predicted life generated based on impact force profiles of the group of bearings. The remaining life is predicted based on the life predicted by the virtual bearing model.

At act 720, degradation analysis is performed for the bearing by simulating multiple lubricant contamination conditions and varying lubricant viscosity on the virtual bearing model. For example, the lubricant contamination conditions include normal contamination, light contamination, severe contamination, and extreme contamination. For example, the degradation analysis is used to determine fatigue of the bearing with respect to lubricant temperature rise, foreign particles in the lubricant, reduction in oil film parameter of the lubricant, etc.

At act 730, the remaining life is updated using one or more neural networks configured to perform gradient descent optimization. The one or more neural networks include a simple neural network and a multi-variable regression network.

In an embodiment, the simple neural network is applied using cross entropy as the loss function. This is advantageous, as the bearing family information may not be easily determined. Further, the operation data of the bearing may have non-linear relationships and cannot be compared easily. The multi-variable regression network is input with bearing dimensions associated with the bearing. The output of the one or more neural networks includes the updated remaining life based on the bearing dimensions and the bearing family parameters.

At act 740, defect in the bearing is identified based on the impact force profile. Further, a contamination condition of the lubricant in the bearing is displayed on a display device.

Figure 8:
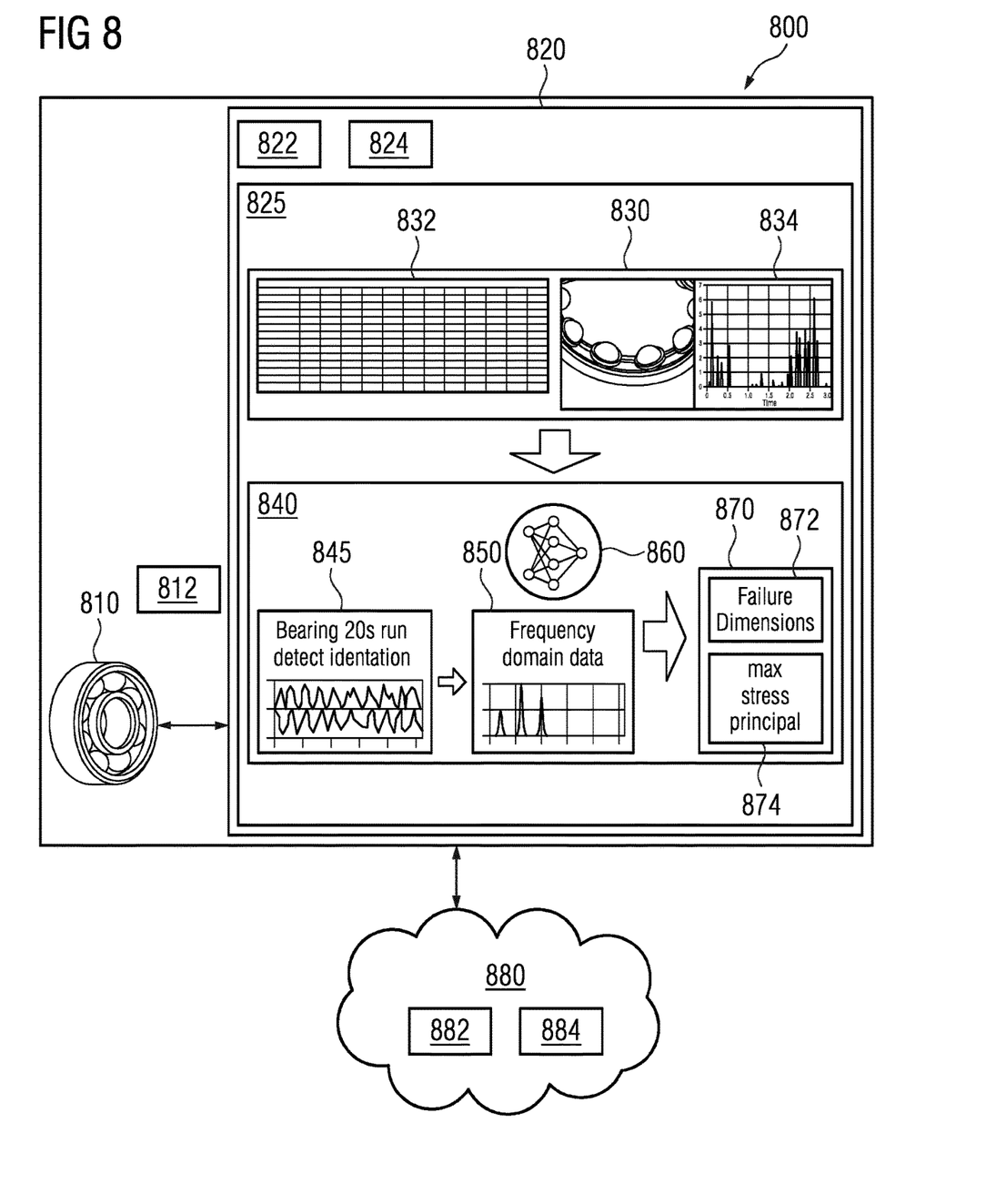
FIG. 8 illustrates an apparatus to determine a condition of a bearing in a system in run-time, according to an embodiment.

FIG. 8 illustrates an apparatus 820 to determine a condition of a bearing 810 in a system 800 in run-time, according to an embodiment.

The bearing 810 is connected to one or more sensing units 812. The sensing units 812 are used to measure operation parameters of the bearing 810 and the system 800. The measured operation parameters are referred hereinafter as the operation data. The operation data is input to an apparatus 820 that is configured to determine the condition of the bearing 810.

The apparatus 820 includes a processing unit 822, a communication unit 824, and a memory unit 825. The apparatus 820 in some embodiments may include the sensing units 812. The apparatus 820 is communicatively coupled to a database 880 provided on a cloud computing environment via the communication unit 824 and wireless communication networks. The database 880 includes operation profiles 882 and impact force profiles 884 of a group of bearings comparable to the bearing 810.

The memory unit 825 includes machine readable instructions that are stored as modules such as a virtual bearing module 830 and a bearing module 840. The modules 830 and 840 are executed by the processing unit 822 during run-time.

The virtual bearing module 830 includes bearing historical data 832 and impact force profiles 834. The bearing historical data 832 may include data associated with the design and manufacture of the bearing 810. The bearing historical data 832 may further include catalogue data and defect history. The impact force profiles 834 may include the impact force profiles 884 or a selection of the impact force profiles 884. The selection of the impact force profiles 884 is made based on the operation data from the system 800.

The bearing module 840 includes a pre-processing module 845, a response module 850, a machine learning module 860, and a condition module 870. The modules 845, 850, and 860 are described hereinafter.

In run-time, the operation data is received by the apparatus and analyzed by the pre-processing module 845. The pre-processing module 845 is configured to normalize the operation data to convert the operation data to a suitable format for analysis. The response module 850 is configured to generate the operation profile for the bearing 810 from the formatted operation data. In an embodiment, the operation profile includes a frequency domain temperature response associated with a lubricant of the bearing 810.

The machine-learning module 860 includes a neural network and a regression network. The neural network employs cross entropy as a loss function to determine a bearing family associated with the bearing 810. The input to the neural network is the catalogue data associated with the bearing 810 and the group of bearings. Further, the operation profile of the bearing 810 is also input to the neural network.

The regression network is used to determine a dimension of the bearing 810 including a rolling element (e.g., a ball). The regression network employs gradient descent optimization to perform multi-variable regression on the operation data and thereby determines the dimension of the bearing 810. Further, the gradient descent optimization is used to determine the weights of the regression network.

The output of the machine learning module 860 is further analyzed by the condition module 870. The condition module 870 analyzes the output in relation to defect and stress using a defect module 872 and a stress module 874, respectively.

Figure 9:
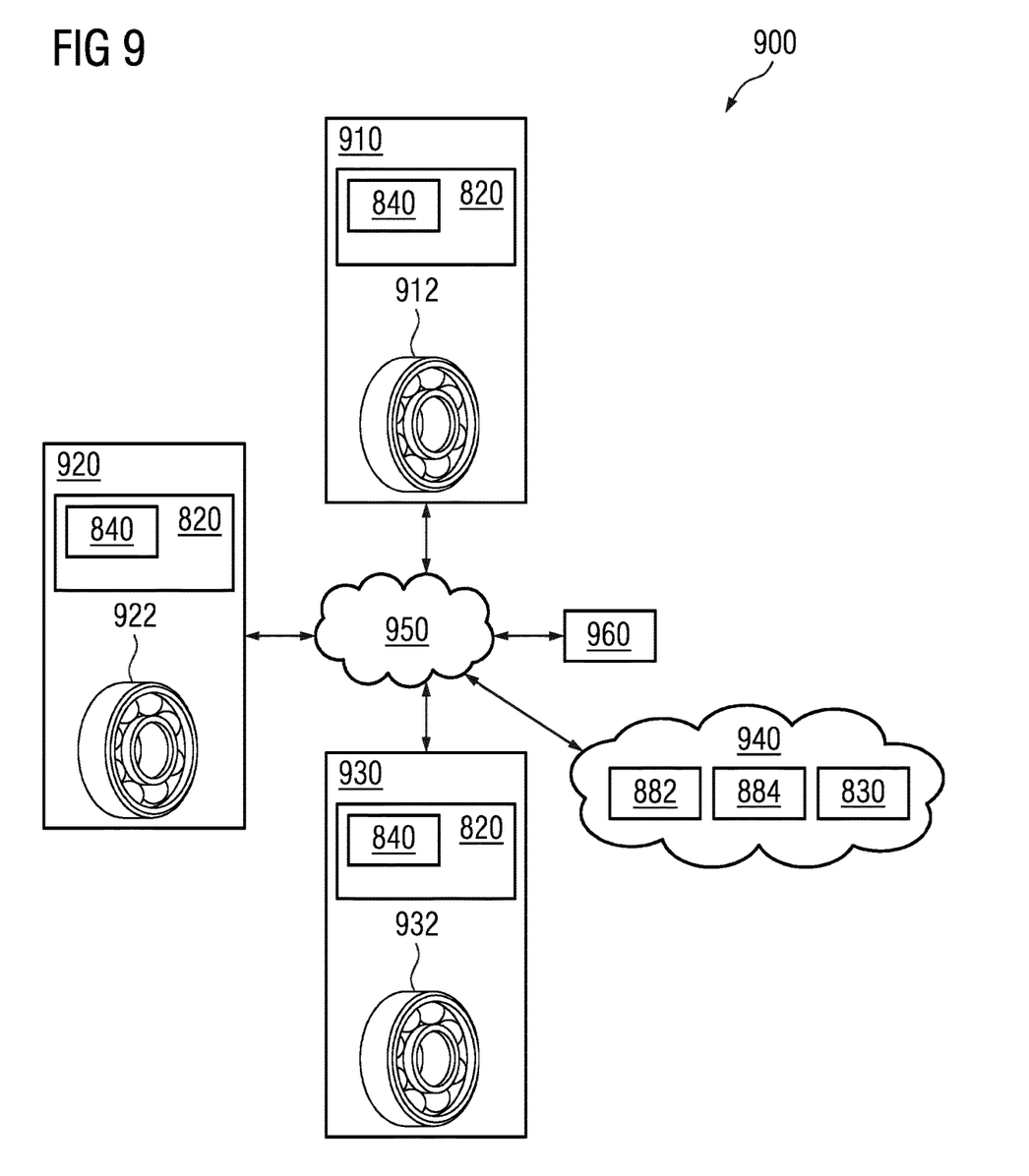
FIG. 9 illustrates a system for determining conditions of multiple bearings in one or more systems, according to an embodiment.

In an embodiment, the virtual bearing model 830 of the apparatus 820 is provided on a cloud computing platform as illustrated in FIG. 9.

FIG. 9 illustrates a system 900 for determining conditions of multiple bearings 912, 922, and 932 in one or more systems 910, 920, and 930. Each of the systems 910, 920, and 930 are provided with the apparatus 820. The apparatus 820 in the present embodiment only includes the bearing module 840.

The virtual bearing module 830 is provided on a cloud computing platform 940 communicatively coupled to the apparatus 820 via a network interface 950. As used herein, "cloud computing" refers to a processing environment including configurable computing physical and logical resources, for example, networks, servers, storage, applications, services, etc., and data distributed over the network (e.g., the Internet). The cloud computing system provides on-demand network access to a shared pool of the configurable computing physical and logical resources. The network is, for example, a wired network, a wireless network, a communication network, or a network formed from any combination of these networks.

The functionalities of the bearing module 840 and the virtual bearing module 830 to determine the condition of the bearings 912, 922, and 932 is as described hereinabove.

The system 900 may also include a display device 960 that is configured to display remaining life of the bearings 912, 922 and 932. In an embodiment, defect in the bearings 912, 922, and 932 may also be displayed by superimposing the defect onto the systems 910, 920, and 930 using augmented reality techniques.

While the present invention has been described in detail with reference to certain embodiments, it should be appreciated that the present invention is not limited to those embodiments. In view of the present disclosure, many modifications and variations would present themselves to those skilled in the art without departing from the scope of the various embodiments of the present invention, as described herein. The scope of the present invention is, therefore, indicated by the following claims rather than by the foregoing description.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method of determining a condition of at least one bearing in a system, the method being computer-implemented and comprising:
   receiving operation data associated with the system from one or more sensors associated with the system, the one or more sensors comprising a vibration sensor, a current sensor, a voltage sensor, a temperature sensor, a magnetic flux sensor, a velocity sensor, or any combination thereof;
   determining an operation profile of the at least one bearing from the operation data, wherein the operation profile includes a vibration response, a thermal response, or the vibration response and the thermal response associated with the at least one bearing;
   determining an impact force profile during operation of the at least one bearing based on the operation profile and a virtual bearing model, wherein the impact force profile is associated with an impact between a rolling element of the at least one bearing and a physical defect of the bearing, wherein the virtual bearing model is trained on operation profiles and impact force profiles associated with a group of bearings comparable with the at least one bearing, and wherein the virtual bearing model is generated based on predetermined defects effected on one or more bearings of the group of bearings by a shaping device; and
   determining the condition of the at least one bearing based on the impact force profile, wherein determining the condition of the at least one bearing based on the impact force profile comprises:
   identifying a defect in the at least one bearing based on the impact force profile; and
   determining a contamination condition of a lubricant in the at least one bearing,
   wherein identifying the defect and determining the contamination condition comprise superimposing the operating profile, which is determined from the operation data received from the one or more sensors, of the at least one bearing on the operation profiles in the virtual bearing model.

2. The method of claim 1, further comprising training the virtual bearing model on the operation profiles and the impact force profiles associated with the group of bearings comparable with the at least one bearing, the training comprising:
   determining test operation profiles based on test operation data associated with the group of bearings,
   wherein a test operation comprises operation data generated from the group of bearings during testing of the bearings, and
   wherein the test operation profiles comprise vibration responses and thermal responses associated with the group of bearings.

3. The method of claim 2, wherein determining the test operation profiles based on the test operation data associated with the group of bearings comprises:
   operating systems including the bearings in one or more system load conditions, wherein the system load conditions indicate a system load on the systems; and
   determining the test operation profiles associated with the group of bearings for the system load conditions, wherein the test operation profiles are generated based on the test operation data received from sensors of the one or more sensors positioned within and outside each bearing of the group of bearings.

4. The method of claim 3, further comprising:
   determining a simulated impact force from the test operation profiles and simulated operation profiles; and
   generating stress distribution associated with the group of bearings based on the simulated impact force.

5. The method of claim 4, wherein determining the simulated impact force from the test operation profiles and the simulated operation profiles comprises:
   predicting the simulated impact force based on the simulated operation profile and a mass of bearing ball, a damping co-efficient, a stiffness associated with the bearing, or any combination thereof,
   wherein the simulated impact force includes a steady component from steady-state movement of the bearings, a dynamic component associated with one or more of the predetermined defects, or the steady component and the dynamic component.

6. The method of claim 4, wherein predicting the stress distribution associated with the group of bearings based on the simulated impact force further comprises:
   comparing the test operation profiles and the simulated operation profiles;
   updating the simulated impact force based on the comparison;
   generating the stress distribution based on the updated simulated impact force; and
   mapping the stress distribution to one or more of the predetermined defects using at least one machine learning algorithm.

7. The method of claim 6, wherein updating the simulated impact force based on the comparison between the test operation profiles and the simulation operation profiles comprises:
   calibrating the updated simulated impact force associated with the group of bearings based on a difference between the test operation profiles and the simulated operation profiles using at least one machine learning algorithm.

8. The method of claim 7, wherein the at least one machine learning algorithm is a differential evolutionary algorithm, and
   wherein calibrating the updated simulated impact force associated with the group of bearings based on the difference between the test operation profiles and the simulated operation profiles using at least one machine learning algorithm comprises:
   defining an upper stress limit and a lower stress limit for the group of bearings;
   determining a probable stress distribution within the upper stress limit and the lower stress limit through a mutation or a recombination operation, wherein the probable stress distribution is determined based on the difference; and
   selecting the stress distribution from the probable stress distribution using continuous function optimization based on impact force difference.

9. The method of claim 2, wherein determining the test operation profiles based on the test operation data associated the group of bearings comprises:
   predicting a life of the bearings when subject to one or more of the predetermined defects based on bearing load, load zone, bearing clearance, lubrication viscosity, lubricant contamination, or any combination thereof associated with the one or more bearings in the group of bearings.

10. The method of claim 9, further comprising:
    predicting a stress distribution associated with the at least one bearing during operation of the at least one bearing, wherein the stress distribution is predicted based on the impact force profile of the at least one bearing and the virtual bearing model; and
    predicting a remaining life of the at least one bearing based on the stress distribution and the predicted life using a neural network,
    wherein the neural network is configured to perform gradient descent optimization.

11. The method of claim 1, wherein determining the condition of the at least one bearing based on the impact force profile comprises:
    determining fatigue of the at least one bearing with respect to lubricant temperature rise, foreign particles in the lubricant, reduction in oil film parameter of the lubricant, or any combination thereof based on the virtual bearing model.

12. An apparatus for determining a condition of at least one bearing in a system, the apparatus comprising:
    one or more processing units; and
    a memory unit communicatively coupled to the one or more processing units, wherein the memory unit comprises a bearing module and a virtual bearing module stored in the form of machine-readable instructions executable by the one or more processing units, wherein the bearing module is configured to:
    receive operation data associated with the system from one or more sensors associated with the system, the one or more sensors comprising a vibration sensor, a current sensor, a voltage sensor, a temperature sensor, a magnetic flux sensor, a velocity sensor, or any combination thereof;
    determine an operation profile of the at least one bearing from the operation data, wherein the operation profile includes a vibration response, a thermal response, or the vibration response and the thermal response associated with the at least one bearing;
    determine an impact force profile during operation of the at least one bearing based on the operation profile and a virtual bearing model, wherein the impact force profile is associated with an impact between a rolling element of the at least one bearing and a physical defect of the bearing, wherein the virtual bearing model is trained on operation profiles and impact force profiles associated with a group of bearings comparable with the at least one bearing, and wherein the virtual bearing model is generated based on predetermined defects effected on one or more bearings of the group of bearings by a shaping device; and
    determine the condition of the at least one bearing based on the impact force profile, wherein the determination of the condition of the at least one bearing based on the impact force profile comprises:
    identification of a defect in the at least one bearing based on the impact force profile; and
    determination of a contamination condition of a lubricant in the at least one bearing,
    wherein the identification of the defect and the determination of the contamination condition comprise superimposition of the operating profile, which is determined from the operation data received from the one or more sensors, of the at least one bearing on the operation profiles in the virtual bearing model,
    wherein the virtual bearing module is configured to train the virtual bearing model on the operation profiles and the impact force profiles associated with the group of bearings comparable with the at least one bearing, the training of the virtual bearing model comprising:
    determination of test operation profiles based on test operation data associated with the group of bearings,
    wherein a test operation comprises operation data generated from the group of bearings during testing of the bearings, and
    wherein the test operation profiles comprise vibration responses and thermal responses associated with the group of bearings.

13. A system comprising:
    one or more devices operable to provide operation data associated with operation of one or more systems; and
    an apparatus communicatively coupled to the one or more devices, the apparatus being for determining a condition of at least one bearing in the system, the apparatus comprising:
    one or more processing units; and a memory unit communicatively coupled to the one or more processing units, wherein the memory unit comprises a bearing module and a virtual bearing module stored in the form of machine-readable instructions executable by the one or more processing units, wherein the bearing module is configured to:

receive operation data associated with the system from one or more sensing units associated with the system, the one or more sensors comprising a vibration sensor, a current sensor, a voltage sensor, a temperature sensor, a magnetic flux sensor, a velocity sensor, or any combination thereof;

determine an operation profile of the at least one bearing from the operation data, wherein the operation profile includes a vibration response, a thermal response, or the vibration response and the thermal response associated with the at least one bearing;

determine an impact force profile during operation of the at least one bearing based on the operation profile and a virtual bearing model, wherein the impact force profile is associated with an impact between a rolling element of the at least one bearing and a physical defect of the bearing, wherein the virtual bearing model is trained on operation profiles and impact force profiles associated with a group of bearings comparable with the at least one bearing, and wherein the virtual bearing model is generated based on predetermined defects effected on one or more bearings of the group of bearings by a shaping device; and determine the condition of the at least one bearing based on the impact force profile, wherein the determination of the condition of the at least one bearing based on the impact force profile comprises:

identification of a defect in the at least one bearing based on the impact force profile; and determination of a contamination condition of a lubricant in the at least one bearing, wherein the identification of the defect and the determination of the contamination condition comprise superimposition of the operation profile, which is determined from the operation data received from the one or more sensors, of the at least one bearing on the operation profiles in the virtual bearing model, wherein the virtual bearing module is configured to train the virtual bearing model on the operation profiles and the impact force profiles associated with the group of bearings comparable with the at least one bearing, the training of the virtual bearing model comprising:

determination of test operation profiles based on test operation data associated with the group of bearings, wherein a test operation comprises operation data generated from the group of bearings during testing of the bearings, and wherein the test operation profiles comprise vibration responses and thermal responses associated with the group of bearings.

14. The method of claim 1, further comprising:
simulating one or more of the predetermined defects on a predefined bearing model associated with the group of bearings; and generating simulated operation profiles associated with the group of bearings based on the simulation of the one or more predetermined defects on the predefined bearing model.

15. The method of claim 1, wherein the operation profile includes the thermal response.

16. The method of claim 1, wherein determining the contamination condition of the lubricant in the at least one bearing comprises:

performing a degradation analysis for the at least one bearing, the performing of the degradation analysis comprising simulating multiple lubricant contamination conditions and varying lubricant viscosity on the virtual bearing model.

17. The method of claim 16, wherein the multiple lubricant contamination conditions include a first contamination, a second contamination more severe than the first contamination, and a third contamination more severe than the second contamination.

18. The method of claim 16, wherein determining the condition of the at least one bearing based on the impact force profile comprises:

determining fatigue of the at least one bearing with respect to lubricant temperature rise, foreign particles in the lubricant, reduction in oil film parameter of the lubricant, or any combination thereof based on the degradation analysis.

\* \* \* \* \*